United States Patent [19]

Hilzinger et al.

[11] Patent Number: 4,743,890
[45] Date of Patent: May 10, 1988

[54] DEACTIVATABLE SECURITY LABEL FOR ANTI-THEFT SYSTEMS

[75] Inventors: Hans-Rainer Hilzinger, Langenselbold; Paul Reinhard; Reiner Dinter, both of Bruchkoebel, all of Fed. Rep. of Germany

[73] Assignee: Vacummschmelze GmbH, Fed. Rep. of Germany

[21] Appl. No.: 933,864

[22] Filed: Nov. 24, 1986

[30] Foreign Application Priority Data

Dec. 21, 1985 [DE] Fed. Rep. of Germany ....... 3545647

[51] Int. Cl.$^4$ ............................................. G08B 13/24
[52] U.S. Cl. ..................................... 340/551; 340/572
[58] Field of Search ................................. 340/551, 572

[56] References Cited

U.S. PATENT DOCUMENTS

| | | | |
|---|---|---|---|
| 3,747,086 | 7/1973 | Peterson | 340/572 |
| 3,781,661 | 12/1973 | Trikilis | 340/572 |
| 3,820,104 | 6/1974 | Fearon | 340/572 |
| 4,158,434 | 6/1979 | Peterson | 340/572 |
| 4,260,881 | 4/1981 | Peterson | 235/493 |
| 4,539,558 | 9/1985 | Fearon | 340/551 |
| 4,686,154 | 8/1987 | Mejia | 428/611 |

FOREIGN PATENT DOCUMENTS 3419785 5/1985 Fed. Rep. of Germany .

Primary Examiner—Glen R. Swann, III
Attorney, Agent, or Firm—Hill, Van Santen, Steadman & Simpson

[57] ABSTRACT

A deactivatable security label comprising a low-coercivity strip and a strip having a high coercive field strength can be advantageously manufactured when the alloy of cobalt, nickle and/or iron is employed which exhibits a coercive field strength of between 20 and 50 A/cm given a remanence of more than one Tesla and when this strip is secured to a low-coercivity strip of amorphous material by means of spot welding.

8 Claims, 3 Drawing Sheets

DEACTIVATABLE SECURITY LABEL FOR ANTI-THEFT SYSTEMS

BACKGROUND OF THE INVENTION

The present invention is directed to a deactivatable security label for anti-theft systems wherein a low-coercivity strip can alter an alternating magnetic field generated in a testing zone to thus, trigger an alarm. The low-coercivity strip comprises at least first and second strips arranged close to one another and composed of a ferromagnetic material, at least the first strip being composed of a low-coercivity material having a high permeability and low coercive field strength and at least the second strip having a high coercive field strength and being magnetizable so that the arising scattered field permeates the first strip of low-coercivity material in sections in mutually opposite directions.

An anti-theft system using a strip of the above mentioned type is disclosed in U.S. Pat. No. 3,820,104 whose disclosure is incoporated by reference thereto. As disclosed in this patent, a narrow, low-coercivity strip, which is obtained from a soft-magnetic material, is arranged in the proximity of a significantly broader strip of a magnetic material having a higher coercive field strength. When this arrangement is brought into a zone comprising an alternating magnetic field, then the low-coercivity strip alters this alternating field and induces voltage harmonics in a coil influenced by the alternating field. These voltage harmonics can be interpreted or utilized for triggering an alarm.

When one wishes to deactivate this known security label, then the broader magnetic strip having a high coercive field strength can be magnetized in a longitudinal direction. A fringing flux is generated because of openings which were provided in this broad strip at selected intervals and this fringing flux magnetizes the low-coercivity strip in mutually opposite directions in adjacent sections. In this condition, the low-coercitvity strip is largely saturated so that it does not generate any harmonics or, respectively, generates different and significantly smaller harmonics when it is introduced into the alternating field. Thus, the strip is deactivated and does not trigger an alarm.

Other known arrangement exhibit similar functions. In U.S. Pat. No. 3,747,086, whose disclosure is incorporated by reference thereto, the security labels are composed of two or more strips arranged near one another and having different coercive field strengths. For the deactivation of this label, one of the strips comprises an adequate cross section in order to saturate the low-coercivity strips so that no remagnetization of the strip occurs due to the alternating magnetic field.

In another known arrangement, which is disclosed in German OS No. 34 19 785, an amorphous tape is employed as a low-coercivity material. This amorphous tape is connected to short strips of hard magnetic materials which are arranged at intervals from one another. Hereto, the magnetization of these hard magnetic strips generates differently premagnetized sections in the low-coercivity tape so that the low-coercivity tape or strip no longer generates any harmonics which lead to the triggering of an alarm.

SUMMARY OF THE INVENTION

The object of the present invention is to provide a deactivatable security label which makes do with the smallest possible components of magentic material having a high coercive field strength and which can be activated and deactived. Moreover, the security label is composed of a single piece and can, therefore, be wound in tape form on a reel from which the labels can be subsequently cut off in accordance with the desired length and can be connected to the goods to be protected.

This object is achieved by an improvement in a deactivatable security label for an anti-theft system wherein a low-coercivity label can alter an alternating magnetic field generated in a testing zone to trigger an alarm, said label is composed of at least a first and second strips of ferromagnetic material arranged close to one another of which at least the first strip is composed of the low-coercivity material having a high permeability and low coercive field strength and the second strip exhibits a higher coercive field stength and is magnetizable so that the occurring fringing field permeates the first strip in mutually opposite directions in adjacent sections. The improvements are that the strips forming the security label are firmly connected to one another to form a laminate and that the second strip with the high coercive field strength is composed of a cobalt-based alloy which additionally contains either nickel or a combination of nickel and iron and whose coercive field strength lies in a region of 20 to 50 A/cm given a remanence induction of more than one Tesla, and that a series of differentially polarized magnets serve for the deactivation of the security label with these magnets being positioned to oppositely magnetize the security label in sections. The second strip may be composed of an alloy having 9–15 wt % nickel, more than 50 wt % cobalt, and the remainder iron and which includes up to 4 wt % additives selected from a group consisting of aluminum, titanium and niobium. The second strip may be composed of an alloy having 9–12 wt % nickel, 54–59 wt % cobalt, the remainder being iron and up to 3% of an additive selected from a group consisting of aluminum and titanium. The second strip may also be heat treated to provide a coercive field strength in a range of 20–50 A/cm given a remenence of more than 1.2 Tesla.

BRIEF DESCRIPTION OF THE DRAWINGS

FIG. 2b having a negative magnetizing value; and FIG. 2c having a positive magnetizing value.

DESCRIPTION OF THE PREFERRED EMBODIMENTS

Figure 1:
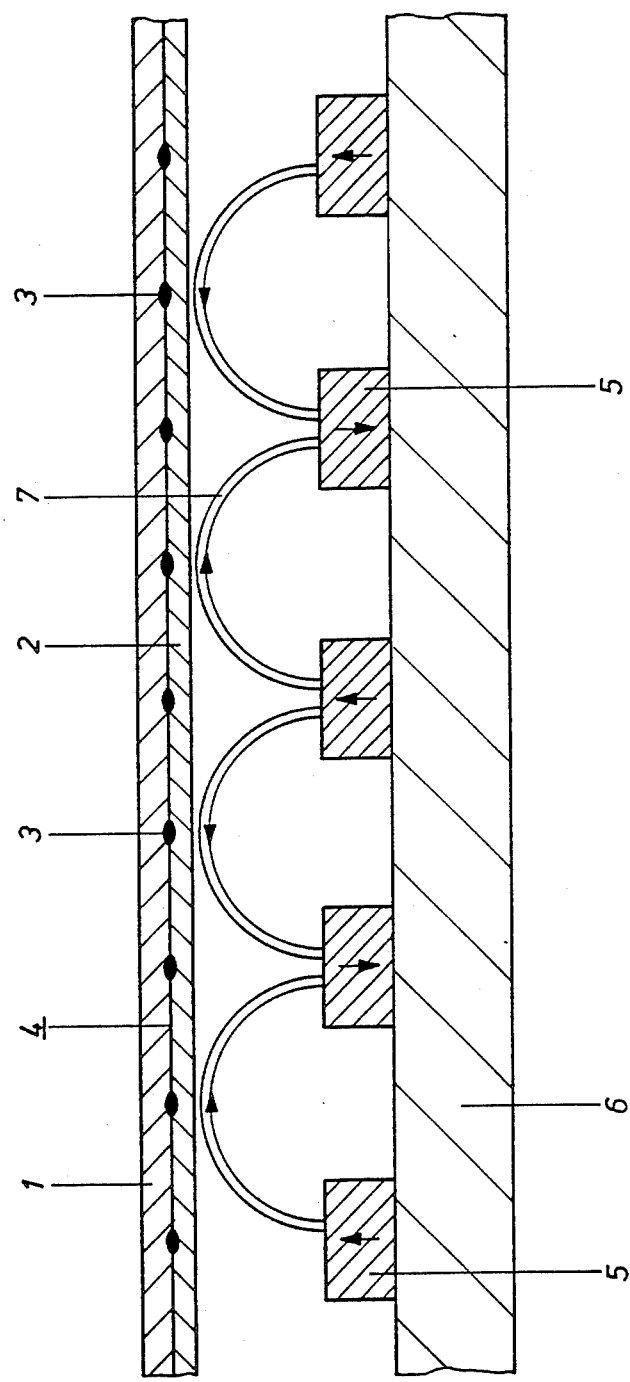
FIG. 1 is a schematic showing of a examplary embodiment of a deactivatable security label placed close to magnatization magnets in accordance with the present invention.

The principles of the present invention are particularly useful when incorporated in a security label 4 of FIG. 1 which is composed of a first strip 1 of low-coercivity material having a high permeability and low coercive field strength and also a second strip 2 of magnetically half-hard alloy containing cobalt, nickel and iron. The strips 1 and 2 are firmly connected to one another by means of a seam weld or by means of spot welds 3 which are formed by the assistance of a resistance spot welding method. The security label 4 can be cut from a rolled up tape containing the strips 1 and 2. The spot welds 3 connect the strips 1 and 2 so firmly that the occurring shearing forces can be absorbed when bending the security label.

Advantageously, the spot welds are at a distance in a range of between 10 and 50 mm from one another. However, in some other instances it is conceivable that a spacing of 3 mm is required or that a spacing of the two neighboring spot welds 3 can be up to 500 mm. Thus, a larger range of 3 to 500 mm can be selected.

For deactivication, premanent magnets 5 of, for example, CoSm are applied to a plate 6 with a magnetization direction of each of the magents 5 being opposite to one another and the plate 6 acting as a magnetic return. The magnetization direction of the magnets 5 is indicated by the arrows and lines 7 indicate some of the fringe field lines generated by these magnets 5. Due to the low coercive field strength and the remanence which is rather high at the same time, the material employed for the second strip 2 having the high coercive field strength offers the advantage of a relatively small cross section as compared to the cross section of the first strip 1 can be provided and that the commercially available permanent magnets 5 can be employed for deactivation. This is true because the relative low magnetic field suffices in order to remagnetize the material of the second strip 2. This is also particularly true since the selected material exhibits a significantly more rectangular magnetization loop than, for example, other magnetic materials so that the magnetization field strength need not be selected significantly greater than the coercive field strength in order to achieve the maximum possible remanence. When the strip 2 is not brought to the proximity of the permanent magnets 5 in the direction shown in FIG. 1 but, for example, is conducted past one of the permanent magnets 5 in a direction extending perpendicular to the direction illustrated in FIG. 1, then a uniform magnetization of the second strip 2 will occur and this will result in a chronological shift of the achieved harmonics in the magnetic alternating field but not in a modification of the intensity of these harmonics. This method can, therefore, be employed for reactivating the label without demagnetizing means being required. This may be seen, for example, from the diagrams in FIGS. 2a–2c.

Figure 2A:
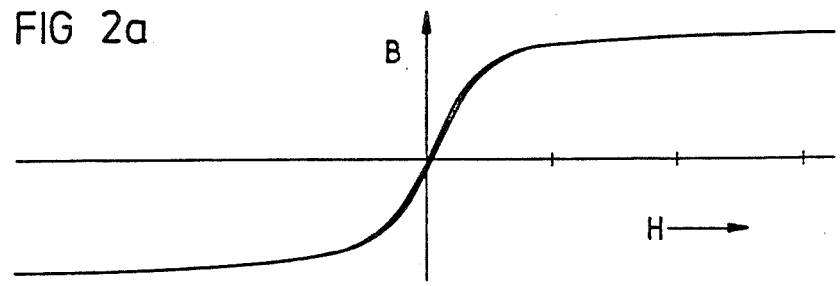
FIGS. 2a, 2b and 2c are hysteresis curves of the security label of the invention with FIG. 2a illustrating a curve for the strip which is largely demagnetized and has a 0 field strength.
Figure 2B:
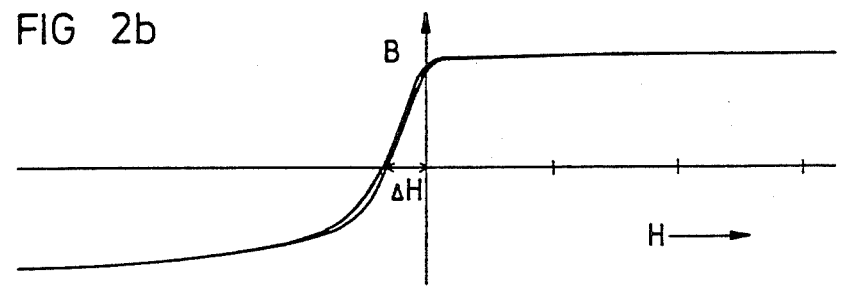
Figure 2C:
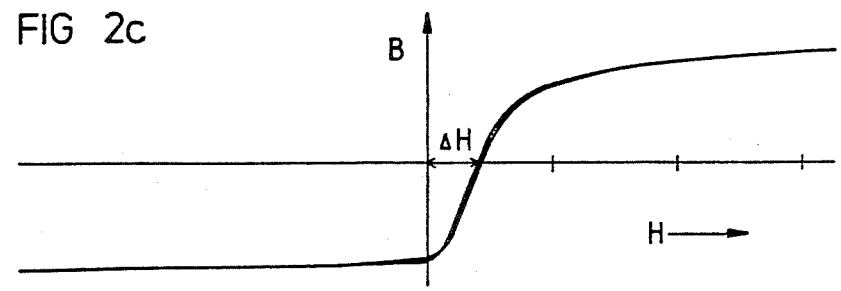

FIG. 2a shows the hysteresis curve for the security label of the invention for the case wherein the strip 2 is largely demagnetized. When it is assumed that the field strength of the alternating field influences the strip fluctuations between +3 A/cm and −3 A/cm, then the first strip 1 is remagnetized in the region of the field strength 0, this yielding voltage pulses, which are the cause for generating a harmonic triggering of the alarm. When the security strip is magnetized in one or the other directions, then conditions shown in FIGS. 2b and 2c will occur. It can be seen that the region of the remagnetized shift towards the negative or respective positive values. This shows that even given a magnetized strip 2, remagnetization of the strip 1 occurs whereby the voltage pulses appear in the magnetic alternating field are merely chronologically shifted. When the security label 4 is deactivated in accordance with the arrangement of FIG. 1, then adjacent regions having different magnetization directions occur in the strip 2 and this results in a significantly higher fringing field than in the overall strip 2 were magnetized in one direction. The results of this is that the first strip 1 is n longer remagnetized over its full length given the same field influence as in FIG. 2.

Figure 3:
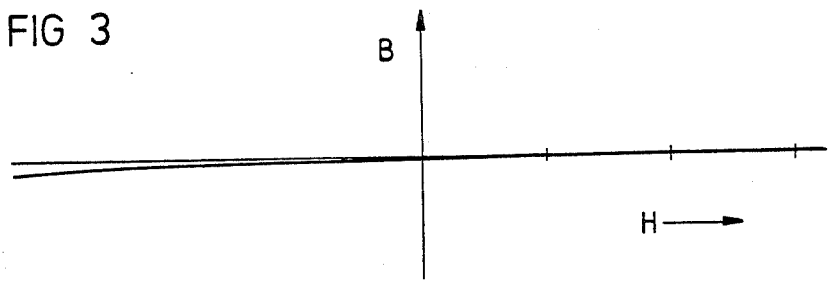
FIG. 3 illustrates the remagnetizing of a strip when adjacent regions or sections have different directions of magnetization in accordance with the present invention.

Thus, with the different magnetization direction, the alternating field influences will create a curve as illustrated in FIG. 3. It turns out that the induction given a field change from +3 A/cm to −3 A/cm hardly changed anymore. The harmonic voltage induced in the alternating field is drastically reduced and the alarm is no longer triggered.

Tests have shown that the following alloys are suitable as a magnetic material for the second strip 2 having a high coercive field strength in combination with a first strip of amorphous metal:

12 wt % Iron, 3.1 wt % Niobium, 0.5 wt % Manganese, 0.2 wt % Silicon, with the remainder being Cobalt;
58.1 wt % Cobalt, 10 wt % Nickel, 2.2 wt % Aluminum, 2.1 wt % Titanium with the remainder Iron; and
55.1 wt % Cobalt, 11.5 wt % Nickel, 3 wt % Titanium, 1.2 wt % Aluminum with the remainder Iron.

For example, one through five strips of the last mentioned alloy having a dimension of a width of 0.5 mm and a 0.05 mm thickness were glued onto an amorphous tape of a cobalt based alloy having a width of 2.5 mm and a thickness of 0.025 mm. Even given employment of only two strips effectively overall cross section of $1.0 \times 0.05$ mm, a deactivation was possible given employment of a CoSm magnets and a distance between security label 4 and the permanent magnets 5 of a range of 5–8 mm.

In addition, the hard magnetic material was rolled to the dimension of $2.5 \times 0.033$ mm and by means of thermal or heat treatment was set to a coercive field strength of 46 A/cm for a first sample and to a coercive field strength of 20 A/cm in a second sample. 10 meters length of each sample were welded to an amorphous, low-coercivity tape by means of spot welding to provide two sample tapes. Given the tape having a 46 A/cm coercive field strength, a deactivation of the distance of 5 mm from a permanent magnet 5 can be undertaken and for a specimen from the second sample having a coercive field strength of 20 A/cm, a deactivation can be undertaken up to a distance of 9 mm. In the test a 75 mm and a 90 mm were selected as strip lengths and an adequate response reliablity of the alarm system was thereby identified. The permanent magnet 5 advantageously exhibited a spacing of about 5 mm through 6 mm from one another. Given a deactivation of the security label 4 at a distance of 5 mm through 8 mm, this spacing was recognized as advantageous.

The security labels need not necessarily be oriented parallel to a series of permanent magnets. A slanted orientation is also possible. The only thing deriving thereby is a slight change in the magnetization distribution. A reliable deactivation was possible up to a slanted orientation of about 70° relative to the parallel position shown in FIG. 1. It turns out to be particularly advantageous when the strips 1 and 2 are not glued to one another but rather were connected to one another by means of spot welding. The security labels manufacture by means of spot welding exhibit good flexibility given a spacing of 10 mm between the spot welds so that large spot welds spacings up to 50 mm likewise allow good results to be anticipated in normal cases.

Although various minor modifications may be suggested by those versed in the art, it should be understood that we wish to embody with the scope of the patent granted hereon, all such modifications as reasonably and properly come within the scope of our contribution to the art.

We claim:

1. In a deactivatable security label for anti-theft systems, wherein a low-coercivity label can alter an alternating magnetic field generated in a test zone to trigger an alarm, said label being composed of at least first and second strips of ferromagnetic material arranged close to one another with at least the first strip being composed of a low-coercivity material having a high permeability and a low coercive field strength and the second strip exhibiting a high coercive field strength and being magnetizable so that the occurring fringe field permeates the first strip in mutually opposite directions in adjacent sections, the improvements comprising the strips forming the security label being firmly connected to one another to form a laminate, said second strip having the high coercive field strength being composed of a cobalt-based alloy which additionally contains a material selected from a group consisting of nickel and a combination of nickel and iron, a coercive field strength of the second strip being in a range of between 20 and 50 A/cm given a remanence induction of more than one Tesla and that a series of differently polarized magnets serve for deactivation of the security label to oppositely magnetize the security label in sections.

2. In a deactivatable security label according to claim 1, wherein the second strip having the high coercive field strength is composed of an alloy having 9–15 wt % nickel, more than 50 wt % cobalt, and the remainder iron and which includes up to 4 wt % additives selected from a group consisting of aluminum, titanium and niobium.

3. In a deactivatable security label according to claim 1, wherein the second strip having a high coercive field is composed of an alloy having 9–12 wt % nickel, 54–59 wt % cobalt, the remainder being iron and up to 3% of an additive selected from a group consisting of aluminum and titanium.

4. In a deactivatable security label according to claim 1, wherein the first strip of low-coercivity is composed of an amorphous material and is secured to the second strip having the high coercive field strength by means of spot welding.

5. In a deactivatable security label according to claim 4, wherein the spacing between adjacent spot welds is in a range of 3 mm to 500 mm.

6. In a deactivatable security label according to claim 5, wherein the spacing of adjacent spot welds is in a range of 10 mm through 50 mm.

7. In a deactivatable security label according to claim 1, wherein the low-coercivity first strip is secured to the second strip having the high coercive strip by means of a seam weld.

8. In a deactivatable security label according to claim 1, wherein the second strip has been heat treated to provide a coercive field strength in a range of 20–50 A/cm given a remanence of more than 1.2 Tesla.

* * * * *